United States Patent [19]

Malmberg et al.

[11] Patent Number: 5,144,314
[45] Date of Patent: Sep. 1, 1992

[54] PROGRAMMABLE OBJECT IDENTIFICATION TRANSPONDER SYSTEM

[75] Inventors: Eric Malmberg, Santa Cruz; Hien Tran, Aptos; Zbigniew Siemiatkowski, Watsonville, all of Calif.

[73] Assignee: Allen-Bradley Company, Inc., Milwaukee, Wis.

[21] Appl. No.: 808,084

[22] Filed: Dec. 11, 1991

Related U.S. Application Data

[63] Continuation of Ser. No. 113,234, Oct. 23, 1987, abandoned.

[51] Int. Cl.[5] .............................................. G01S 13/80
[52] U.S. Cl. ........................................ 342/44; 342/51
[58] Field of Search ................... 342/42, 44, 51, 50, 342/43

[56] References Cited

U.S. PATENT DOCUMENTS

| 3,964,024 | 6/1976 | Hutton et al. | 342/44 X |
|---|---|---|---|
| 4,068,232 | 1/1978 | Meyers et al. | 342/44 |
| 4,123,754 | 10/1978 | Armstrong | 342/51 X |
| 4,167,007 | 9/1979 | McGeoch et al. | 342/44 |
| 4,185,284 | 1/1980 | Vogel et al. | 342/51 |
| 4,209,783 | 6/1980 | Ohyama et al. | 342/44 X |
| 4,218,680 | 8/1980 | Kennedy | 342/51 |
| 4,242,663 | 12/1980 | Slobodin | 342/44 X |
| 4,345,253 | 8/1982 | Hoover | 342/44 |
| 4,358,765 | 11/1982 | Henoch et al. | 342/44 X |
| 4,550,444 | 10/1985 | Uebel | 342/44 X |
| 4,588,880 | 5/1986 | Hesser | 340/825.23 X |
| 4,641,374 | 2/1987 | Oyama | 455/603 |
| 4,647,931 | 3/1987 | Mawhinney | 342/44 |
| 4,885,588 | 12/1989 | Kawakami | 342/51 |
| 4,899,158 | 2/1990 | Saeki et al. | 342/44 |
| 4,912,471 | 3/1990 | Tyburski et al. | 342/42 |
| 4,926,182 | 5/1990 | Ohta et al. | 342/44 |
| 5,023,888 | 6/1991 | Bayston | 342/189 X |

Primary Examiner—John B. Sotomayor
Attorney, Agent, or Firm—Quarles & Brady

[57] ABSTRACT

A system for indenitfying objects, such as workpieces on an assembly line, includes a transponder for attaching to an object and a radio frequency (RF) transceiver. The transceiver can program the transponder with data about the specific object and interrogate the transponder to obtain previously programmed data. The transponder responds to different RF signal strengths and commands from the transceiver to select whether it will store or transmit data. Data is exchanged between the two devices using Manchester encoding. The transceiver processes the encoded data signal from the transponder by measuring and storing the intervals between level transitions in the signal. The stored intervals are then processed in non-real time to recover the data.

17 Claims, 9 Drawing Sheets

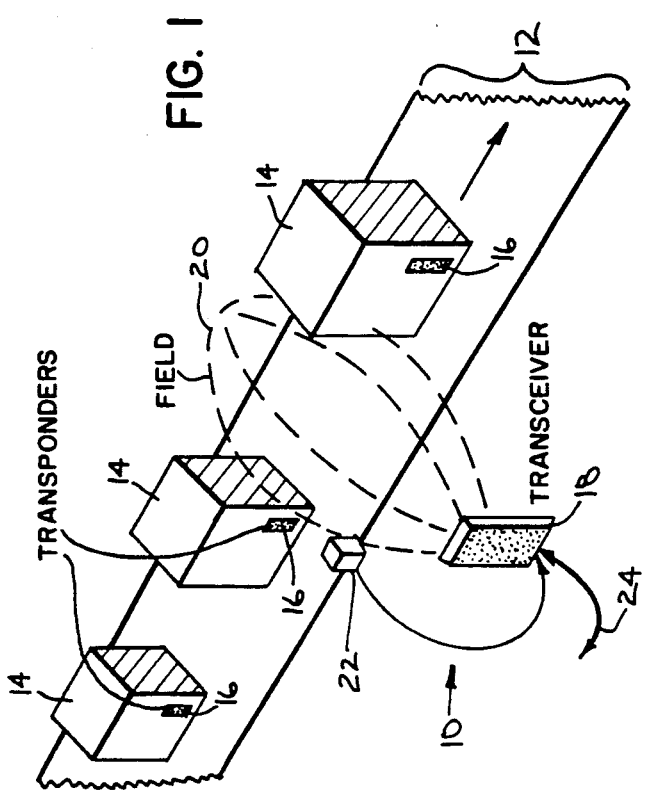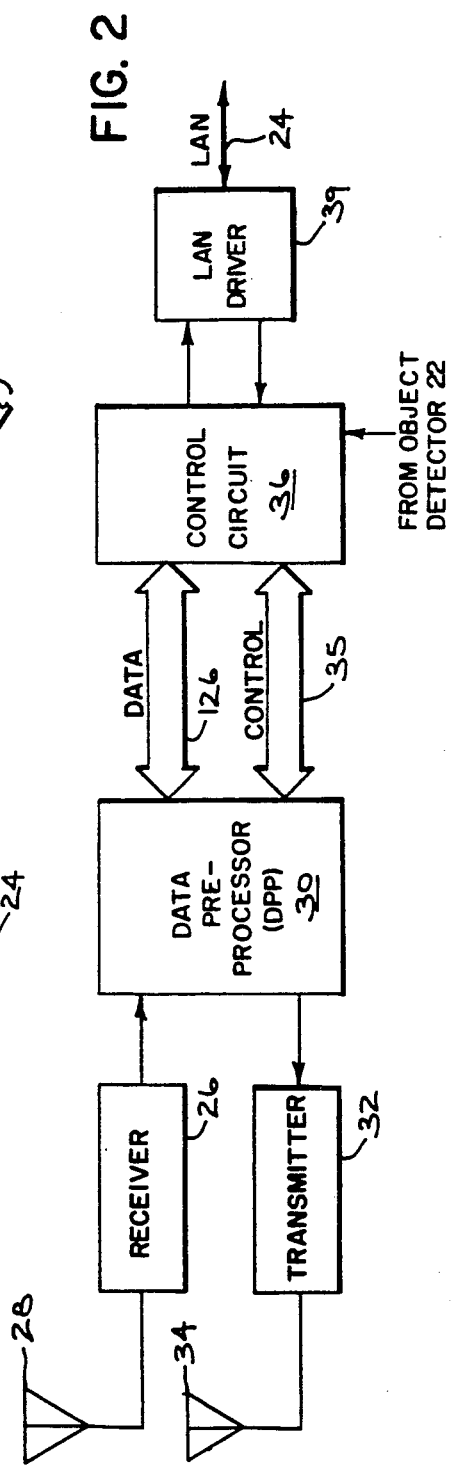

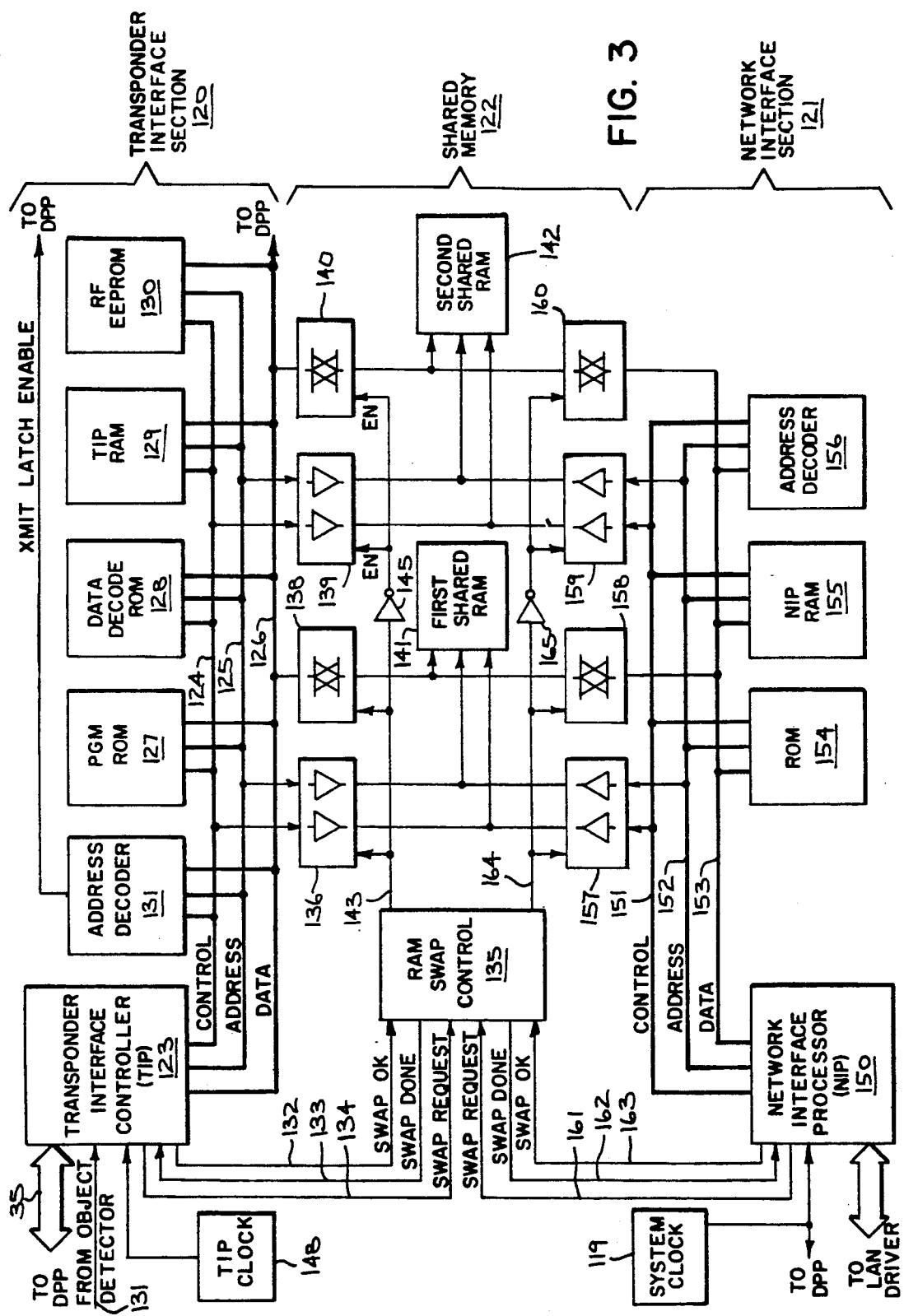

HALFBITS SUBROUTINE

PROGRAMMABLE OBJECT IDENTIFICATION TRANSPONDER SYSTEM

This is a continuation of U.S. patent application Ser. No. 07/113,234 filed on Oct. 23, 1987, now abandoned.

The present invention relates to radio frequency transponders for attaching to objects to identify the object to a transceiver which interrogates the transponder, and particularly to such transponders which are attached to objects on an assembly line.

BACKGROUND OF THE INVENTION

Radio transponders are well known in the transportation field. For example, an air traffic controller may request that a pilot activate his plane's transponder to return a specified code signal when the transponder receives the controller's radar signal. This enables the air traffic controller to identify which one of the numerous "blips" on his radar screen represents the pilot's aircraft. Similar transponders have been attached to railroad freight cars. These devices are preprogrammed to return the serial number of the freight car to an interrogating station. The transponders aid in locating the cars along the railway system.

More recently radio transponders have been temporarily attached to workpieces, for example to automobiles, on an assembly line. As each piece reaches a workstation, it is identified to the manufacturing equipment located at the station. The manufacturing equipment upon detecting the presence of a specific workpiece, interrogates a central data base for information regarding the features of the piece. This enables different types of workpieces to be intermixed on the same assembly line and to identify which options are to be incorporated in the workpiece presently being worked.

A common feature of all of these transponders is the transmission of a unique code sequence upon receiving an interrogating signal at a particular radio or microwave frequency. Up until recently, this unique code sequence was either permanently programmed into a given transponder or an operator had to establish it by a series of switch settings. In several applications of transponders, it is desirable to periodically change the code sequence. For an assembly line, it is desirable to enable the transponder to transmit data regarding the workpiece, such as its color, to the automated manufacturing equipment. With the permanently programmed device, the code sequence could not be changed without replacing the transponder. Although the other type of device allowed the code sequence for a given transponder to be changed, it required operator intervention.

SUMMARY OF THE INVENTION

The present object identification system includes a radio transponder and a radio transceiver for interrogating the transponder. The transceiver has a transmitter section for modulating a radio frequency carrier. The transmitter emits an unmodulated carrier signal to interrogate the transponder. If the level of the signal received by the transponder is above a first threshold, the transponder will transmit its data to the transceiver. The transceiver includes a section for receiving and demodulating the return radio frequency signal from the transponder to detect the data signal.

A data preprocessing section receives the data signal from the receiver section and times the intervals between each level transition of the data signal. These intervals are stored in a memory of the data preprocessing section. A control circuit, which governs the operation of the transceiver, examines the intervals stored in the data preprocessing section to recover the data that is encoded in the data signal. The recovered data is then sent via an input/output (I/0) circuit to an external data utilization device.

The control circuit also governs the operation of the transceiver. In response to external commands received via the I/0 circuit, the control circuit generates instructions and data for transmission to the transponder. A higher power signal, than the interrogation signal, is generated by the transmitter to carry the instructions and data to the transponder.

The transponder includes a tuned demodulator which detects modulation on the signal from the transceiver. Also included is a circuit that responds to the strength of the received signal. If the signal strength is above a first threshold level, the transponder begins transmitting data stored in a memory. When the signal strength is above a second level, the transponder continues sending its data, but also begins inspecting the output of its demodulator for commands from the transceiver. In response to a specific command, the data received from the transceiver is stored in the transponder memory.

An object of the present invention is to provide an object identification system in which a transceiver interrogates a transponder on the object. Upon interrogation the transponder returns data which identifies the object and may also provide information regarding the characteristics of the object.

Another object of the present invention is to provide a transponder in which the data it sends to the transceiver is programmable. This programming can be carried out without coming into physical contact with the transponder and even while it is moving past the transceiver.

A further object is to enable the transponder to be powered by energy from electromagnetic radiation received from the transceiver. The level of the received energy is also used in part to place the transponder in a read only mode or a data programming storage mode.

The transponder employed with the present object identification system is designed with the object of providing a device that can receive, store and transmit the programmed data in an encoded format without having to decode the received data and re-encode the data for transmission.

Yet another object of the present invention is to provide an identification system in which different amounts of data can be stored in and transmitted by the transponder depending upon the amount of information desired about each object. To this end, the system can accommodate several data formats, some of which utilize data compression techniques.

A further object of the present system is to provide a transceiver that can receive Manchester encoded data from the transponder at a high data rate. This enables the object to which the transponder is attached to move by the transceiver at a high rate of speed. The transceiver stores the length of time between transitions in the Manchester data signal as the signal is received. The transceiver then in a non-real time basis processes the time information to recover the encoded data.

BRIEF DESCRIPTION OF THE DRAWINGS

FIG. 1 is a pictorial representation of the present invention incorporated on a product assembly line;

FIG. 2 is a block diagram of the transceiver for the present system;

FIG. 3 is a schematic block diagram of the control circuit in the transceiver of FIG. 2;

DESCRIPTION OF THE PREFERRED EMBODIMENT

Figure 4:
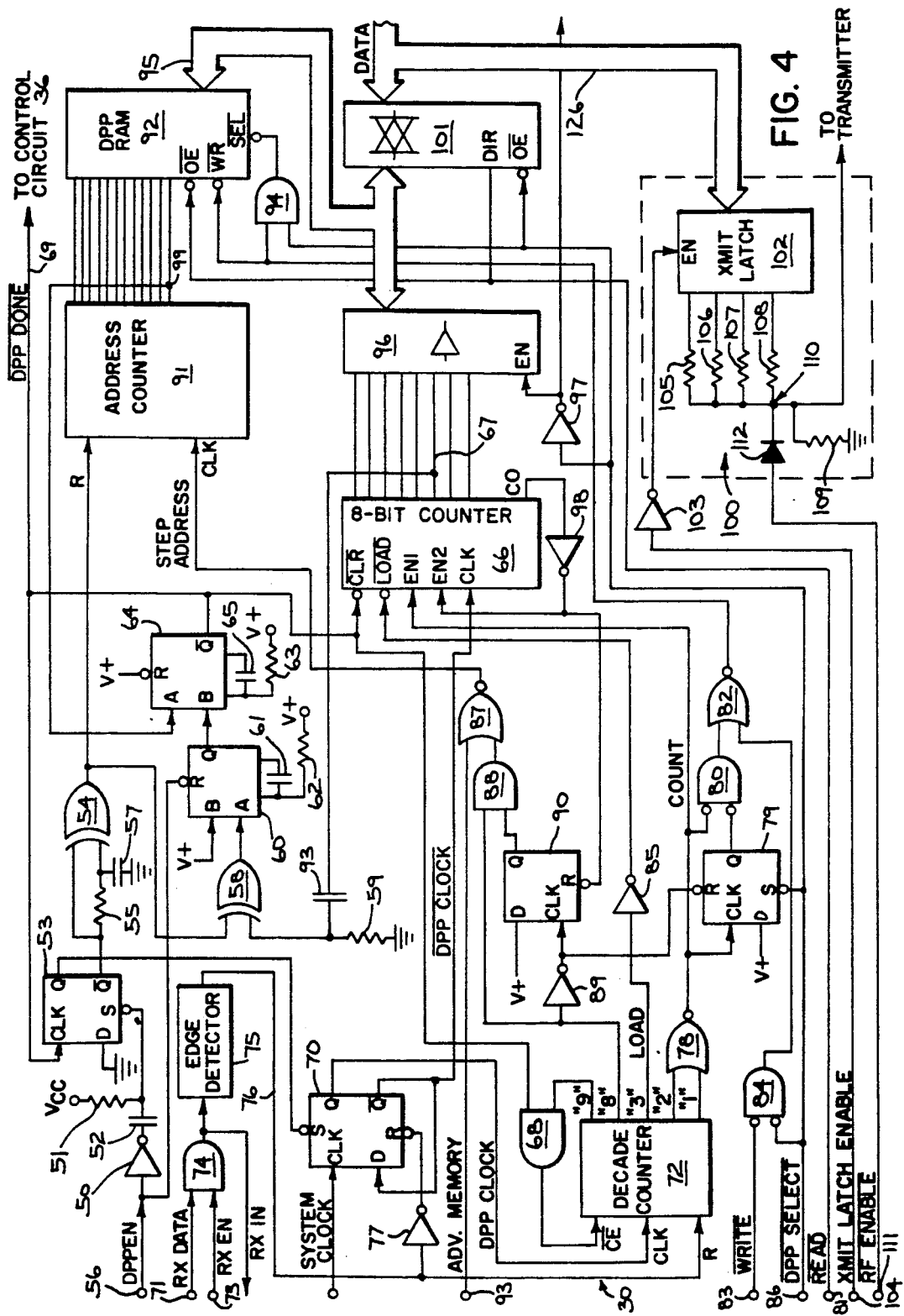
FIG. 4 is a schematic diagram of the data preprocessor circuit for the FIG. 2 transceiver.

With initial reference to FIG. 1, the present transponder system 10 is incorporated along an assembly line 12. The assembly line carries various workpieces 14 from one workstation to the next along the line. Attached to each workpiece 14 or a fixture carrying the workpiece is a radio frequency transponder 16. Mounted alongside the assembly line is an object detector 22 and a radio frequency transceiver 18. The object detector 22, which may be a conventional limit switch, signals the transceiver when a workpiece 14 is approaching the transceiver. In response to the detection of an approaching workpiece the transceiver 18 begins transmitting an interrogation signal at 915 MHz for example. This radio frequency (RF) signal produces a field 20, represented by dashed lines through which the workpieces and their transponders pass. As used herein the term "radio frequency" includes microwave frequencies and other frequency bands of electro-magnetic radiation with which the present invention may be used.

When a transponder 16 enters the transceiver's RF field 20, it is activated and begins transmitting data back to the transceiver 18. The data which is stored in a memory in the transponder not only identifies the particular workpiece, but also can provide information about its characteristics to the manufacturing equipment along the assembly line. For example, upon detecting the carrier signal at 915 MHz from the transceiver, the transponder 16 serially transmits bits of data from its memory. The transponder's signal in this example is twice the transceiver's carrier frequency or 1830 MHz. In order to identify rapidly moving workpieces, the transponder transmits its data at rates between 40 to 200 kilo-bits per second using conventional Manchester data encoding.

The signal from the transponder 16 is picked up by a receiver within the transceiver 18 and is demodulated to recover the transmitted data. The transponder data is forwarded by the transceiver 18 over a local area network (LAN) 24 to a device which utilizes the data, such as a host computer (not shown) controlling the equipment along the assembly line. The transceiver 18 also receives commands and data from the network 24.

The transceiver 18 can also transmit data to the transponder 16 to program its memory with the characteristics of the workpiece. This is typically done by a transceiver that is located near the beginning of the assembly line 12. However, the transponder data maybe changed along the assembly line to indicate that various steps have been performed.

Transceiver Circuit

An overview diagram of the transceiver circuitry for the object identification system is shown in FIG. 2. The transceiver 18 includes a transmitter 32 for sending the data and interrogation signals to the transponder 16 via a transmitter antenna 34. The signals are transmitted by amplitude modulating a 915 MHz carrier signal in the preferred embodiment of the present invention. A receiver antenna 28 is coupled to a receiver 26 which is tuned to 1830 MHz, the exemplary carrier frequency of the transponder 16. The receiver 26 demodulates the amplitude modulated signal from the transponder 16 to detect the Manchester formatted data.

Both the receiver 26 and the transmitter 32 are coupled to a data preprocessor (DPP) 30. The function of the DPP 30 is to temporally buffer the received data from the transponder 16. As noted above, this data can have a data rate as high as 200 kilo-bits per second. In order to accommodate the high data rate, the transceiver 18 does not decode the Manchester data in real-time. Instead, the time interval between each level transition of the Manchester formatted signal is stored in a buffer memory within the DPP 30. After the data has been received the transition intervals are read out of the memory at a slower rate and processed to recover the transmitted data. The DPP 30 also digitally filters the incoming data signal to insure that it is within the valid data rate band-width from the transponder. By enabling the transceiver 18 to process a range of data rates, it is compatible with other types of transponders than just the one described herein.

The DPP 30 is connected to a transponder control circuit 36 by a data bus 126 and a set of control lines 35. The control circuit 36 processes the transition intervals stored in the DPP 30 to recover the baseband data received from the transponder 16. The control circuit also formats the data for transmission to the transponder 16 to program its memory. A driver circuit 39 interfaces the control circuit 36 to the local area network (LAN) 24 enabling the data from the transponder to be sent to a host computer. The control circuit 36 is also connected to the object detector 22.

The details for the circuitry of the DPP 30 are shown in FIG. 4. The DPP 30 receives an enable signal DPPEN from the control circuit 36 on terminal 56 which is coupled by an inverter 50 and a capacitor 52 to the set input of a first flip-flop 53. The set input of the first flip-flop 53 is coupled to the positive supply voltage Vcc by resistor 51. The not Q output of the first flip-flop 53 is directly connected to one input of first exclusive OR gate 54 and by a resistor 55 to the other input of the first exclusive OR gate. The other input of the first exclusive OR gate 54 is also coupled to ground by a capacitor 57. The output of the first exclusive OR gate 54 is coupled to one input of a second exclusive OR gate 58 whose output is connected to the rising edge trigger input (A) of a first monostable multi-vibrator (one-shot) 60. The reset terminal of one-shot 60 is directly connected to the input terminal 56 for the DPPEN signal. A capacitor 61 and a resistor 62 are coupled to the first one-shot 60 to form its timing network. The values of capacitor 61 and resistor 62 are chosen so that the first one-shot 60 produces a high output pulse for approximately 2 milliseconds.

The output pulse from the first one-shot that appears at its Q output is coupled to the falling edge trigger input (B) of a second one-shot 64. The second one-shot 64 has a timing network consisting of capacitor 65 and resistor 63 which produces a short low level pulse at its not Q output for approximately 0.07 milliseconds. A low level pulse at the not Q output of the second one-shot 64 provides an indication that the signal processing of the DPP 30 has been completed. As will be seen, this indication is provided when valid data is not received within a fixed period of time or when enough signal data has been received to insure satisfactory data decoding. The completion signal, designated DPP DONE, is coupled to the clock input of the first flip-flop 53 and to an output terminal 69 of the DPP 30 which is connected to the control circuit 36. The DPP DONE signal is also connected to the active on a low level clear input terminal of an eight-bit counter 66 and to one input of a first AND gate 68.

The Q output of the first flip-flop 53 is coupled to the set terminal of a second flip-flop 70. The clock input terminal of the second flip-flop 70 receives a 6 MHz clock signal generated by a system clock 119 of the transceiver 18 (FIG. 3). The Q output of the second flip-flop 70, designated as the DPP CLOCK signal, is coupled to the clock input of a decade counter 72, such as a 74HC4017 integrated circuit, which has ten decoded outputs. The not Q output of the second flip-flop 70 is the inversion of the DPP CLOCK signal and is coupled back to its D input and to the clock input of the eight-bit binary counter 66. The eight bit counter 66 counts the pulses of the inverted DPP CLOCK signal to measure the interval between transitions of the Manchester encoded data signal from the receiver 26.

The data input terminal 71 to the DPP 30 from the receiver 26 is coupled to a first input of a second AND gate 74. The second input of AND gate 74 is connected to terminal 73 which receives a receiver enable signal (designated RX EN) originating from the control circuit 36. The output of the second AND gate 74 (RX IN) is fed back to the control circuit 36 as an indication that data has been received by receiver 26. The output of the second AND gate 74 is connected to an edge detector 75 which produces an output pulse on line 76 for each transition in the received data signal, RX DATA. The output of the edge detector 75 is directly connected by line 76 to the reset input of the decade counter 72 and via an inverter 77 to the reset input of the second flip-flop 70.

The decade counter 72 produces output signals which control the sequence of operations within the DPP 30. The output terminal of the decade counter 72 for the count of "9" is coupled to the other input of the first AND gate 68 whose output is connected to the active low level counter enable input for the decade counter 72. The outputs terminals of the decade counter 72 for the decimal counts of "1" and "2" are both connected to separate inputs of a first NOR gate 78. The output of the first NOR gate 78 is directly connected to the clock input of a third flip-flop 79. The D input of the third flip-flop 79 is directly connected to a source of a positive voltage potential and the set input of the third flip-flop 79 is connected to an input terminal 86 of the DPP 30 which receives memory access signal designated DPP SELECT from the control circuit 36. The output of the third flip-flop 79 is connected to the other input of the second NOR gate 80. The output of the second NOR gate 80 is coupled to an input of a third NOR gate 82. The other input of the third NOR gate 82 is directly connected to the output of a fourth NOR gate 84. One input of the fourth NOR gate 84 is connected to the terminal 86 receiving the DPP SELECT signal and the other input is connected to a terminal 83 of the DPP 30 which receives an active low level memory WRITE signal from the control circuit 36.

The output terminal of the decade counter 72 for the decimal count of "3" is coupled through an inverter 85 to a load control terminal for the eight-bit counter 66. A low level signal applied to this terminal causes the value of three to be loaded into the eight bit counter 66. The output terminal of the decade counter 72 for the decimal count of "8" directly to a third AND gate 88 and via an inverter 89 to the reset input of the third flip-flop 79. The output of the inverter 89 is also connected to the clock terminal of a fourth flip-flop 90. The D input of the fourth flip-flop 90 is coupled to a source of positive voltage potential. The Q output of the fourth flip-flop 90 is connected to the other input of the third AND gate 88 whose output is coupled to an input of a fifth NOR gate 87. The other input of the fifth NOR gate 87 is coupled to a terminal 93 of the DPP 30 which receives a signal from the control circuit 36 which is designated ADVANCE MEMORY. The ADVANCE MEMORY signal is used by the control circuit 36 address the data stored in the DPP, as will be described.

The output of the fifth NOR gate 87 is connected to the clock input of a twelve-bit binary address counter 91. The reset input of the address counter 91 is directly coupled to the output of the first exclusive OR gate 54. The twelve output bit lines from the address counter 91 are coupled to the address input terminals of an 8K DPP random access memory (RAM) 92. The twelfth output bit line 99 from the address counter 91 is also coupled to the rising edge trigger input (A) of the second one-shot 64. The output enable terminal (OE) of the DPP RAM 92 receives an active low level READ signal applied to terminal 81 by the control circuit 38. The write enable input terminal of the RAM 92 is coupled to the output of the third NOR gate 82. The third NOR gate 82 is also connected to one input of a fourth AND gate 94. The other input of the fourth NAND gate 94 is coupled to the input terminal 86 which receives the DPP SELECT signal. The output of the fourth AND gate 94 is coupled to the active on a level low chip select input (SEL) of the RAM 92. The DPP SELECT signal from the control circuit 36 determines whether the control circuit or the DPP 30 has control over the access to the DPP RAM 92. If the DPP SELECT signal is high, the memory WRITE, memory READ and MEMORY ADVANCE signals allow the control circuit to read and write data into the DPP RAM 92.

The eight data lines 95 from the RAM 92 are connected to a set of tri-state, bidirectional data buffers 101 which couple the DPP 30 to the data bus 126 of the control circuit 36. The output enable input (OE) of the bi-directional buffer 101 is coupled to terminal 86 which receives the DPP SELECT signal from the control circuit 36. The direction selection terminal (DIR) of the buffer 101 is coupled to the terminal 81 which receives the READ signal from the control circuit 36.

The RAM data terminals 95 are also connected to the output terminals of an eight-bit, tri-state data buffer 96. The data inputs to the buffer 96 are coupled to the output lines from the eight-bit counter 66. The terminal 86 which receives the DPP SELECT signal is coupled via an inverter 97 to the enable input for the buffer 96. The sixth output bit line 67 from the eight-bit counter 66 is also coupled to the second input of the second exclusive OR gate 58 via capacitor 93 and a termination resistor 59 connected to ground. The carry output terminal of the eight-bit counter 66 is coupled via an inverter 98 to the second enable input of the binary counter and to the active low reset input of the fourth flip-flop 90.

The portion of the DPP circuit 30 thus described processes the Manchester formatted data signal from the receiver 26. The DPP 30 also includes a section 100 for processing the data from the control circuit 36 which is to be transmitted. This section 100 delineated by the dash lines in the lower right-hand corner of FIG. 4 contains a transmit data latch 102. The data input terminals of the latch 102 are connected to the data bus 126 of the control circuit 36. An enable input (EN) to the transmit data latch 102 is coupled via an inverter 103 to a terminal 104 of the DPP circuit 30 which carries a signal from the control circuit 36 designated XMIT LATCH ENABLE.

Four of the transmit data latch output bit terminals are connected via separate output resistors 105, 106, 107 and 108 to an output node 110. A fifth resistor 109 in the transmitter section 100 couples the output node 110 to ground. The output resistors 105-108 and the fifth resistor 109 form a voltage summation network. As each latch output resistor 105-108 has a different value, by varying the values of the bits stored in the registers of latch 102 which are coupled to the resistors 105-108, the voltage at the output node 110 can be changed. A terminal 111 of the DPP 30 receives an active low transmitter enabling signal designated RF ENABLE from the control circuit 36. This terminal 111 is connected to the anode of a diode 112 having its cathode connected to the output node 110. A high level of RF ENABLE signal clamps the voltage at node 110 to the full positive power supply voltage of the DPP30. A low level RF ENABLE signal places the node 110 at a voltage which is determined by the bit pattern in the transmitter latch 102. The output node 110 is coupled to the transmitter 32 and its voltage level determines the power level of the transmitter's output signal. When RF ENABLE signal is high, the transmitter is off. When the RF ENABLE signal is low, the transmitter 32 produces an output signal at a power level that is inversely proportional to the voltage at node 110 as determined by the output of the transmitter latch 102.

Since the operation of the DPP circuit 30 is governed by signals from the control circuit 36, a description of the control circuitry is necessary before describing the operation of the DPP 30. With reference to FIG. 3, the control circuit 36 consists of a transponder interface section 120 and a network interface section 121 linked together by a shared random access memory section 122. The transponder interface section 120 couples the control circuit 36 to the DPP and as will be explained in detail later, analyzes the transition intervals stored in the DPP RAM 92 to decode the data from the transponder. The network interface section 121 couples the DPP 30 to the local area network driver 39 and handles the tasks, such as data formatting, associated with communication over the network.

The transponder interface section 120 includes a transponder interface processor (TIP) 123 consisting of a microprocessor, such as an 80C31 manufactured by Intel Corporation. The TIP 123 is a multi-port device whereby the output lines from several ports are coupled to the DPP circuit 30 providing the various control and data signals discussed above. The TIP 123 has its own 8 MHz clock signal generator 148. The TIP 123 is also coupled to a first set of control, address and data buses 124, 125 and 126 respectively. The three buses 124-126 interconnect the various components within the transponder interface section 120.

A program read only memory (PGM ROM) 127 stores the program instructions for the TIP 123 and is connected to the three buses 124-126. Also connected to the three transponder interface section buses is a data decode ROM 128 which contains a look-up table for the decoding of the Manchester formatted data from the transponder 16. A random access memory (RAM) 129 is coupled to the buses 124-126 within the transponder interface section 120 and provides a memory for storing the intermediate results of the processing. An electrically erasable read only memory 130, designated RF EEPROM, contains data defining the parameters of the microwave signal to be transmitted by the transceiver 18. For example, the RF EEPROM 130 contains information defining the transmission duty cycle for the transmitter 32.

The three transponder interface section buses 124-126 are also connected to the shared memory section 122. The control and address buses 124 and 125 are coupled to the input of a first set of transmission gates 136. The outputs of the first set of transmission gates 136 are connected to the control and address inputs of a first shared random access memory 141. The data bus 126 within the transponder interface section 120 is coupled via a first set of bidirectional data gates 138 to the data input terminals of the first shared RAM 141. A second set of transmission gates 139 couples the control and address buses 124 and 125 to the control and address input terminals of a second shared random access memory 142. A second set of bidirectional data buffers 140 couples the data bus 126 to the data input terminals of the second shared RAM 142.

A RAM swap control circuit 135 has a transponder interface section control line 143 which is directly coupled to the enable input terminals of the first set of transmission gates 136 and the first set of data gates 138 and via an inverter 145 to the enable terminals of the second set of transmission gates 139 and the second set of bidirectional data gates 140. The TIP 123 has three control signal lines 132-134 coupled to a RAM swap control circuit 135. By two of these control lines 132 and 134, the TIP 123 signals the RAM swap control 135 that it is all right to swap the two shared RAM's 141 and 142 and that the TIP 123 is requesting that a swap occur. The RAM swap control 135 uses the third control line 133 to signal the TIP 123 when the swap is completed.

With continuing reference to FIG. 3, the network interface section 121 has a similar configuration to the transponder interface section 120. Specifically, the network interface section is built around a network interface processor (NIP) 150, which may be a 80C31 or a 8344 microprocessor. The network interface processor 150 is coupled to a second set of control, address and data buses 151, 152 and 153 respectively. Coupled to the three buses 151–153 in the network interface section 121 is a ROM 154, a RAM 155 and an address decoder 156. A system clock signal generator 119 provides the clock signals for the NIP 150 and the DPP 30.

The network interface section 121 is also coupled to the shared RAM via a series of transmission gates and data buffers. Specifically, the control and address buses 151 and 152 are coupled to the first shared RAM 141 by a third set of transmission gates 157. The data bus 153 within the network interface section 121 is coupled to the data terminals of the first shared RAM 141 by a third set of bi-directional data gates 158. Similarly, the buses within the network interface section 121 are coupled to the second shared RAM 142 by a fourth set of transmission gates 159 and a fourth set of bi-directional data gates 160. Three output lines 161–163 from a port of the network interface processor 150 are coupled to the RAM swap control circuit 135. The swap control circuit 135 has a network interface control line 164 coupled directly to the control inputs of the third set of transmission gates 154 and the third set of data buffers 158. The control line 164 is coupled by an inverter 165 to the control inputs of transmission gates 159 and data buffers 160. A set of three control lines 161–163 extend between the NIP 150 and the RAM swap control 135 and are similar in function to lines 132–134 to the TIP 123.

The signals on control lines 143 and 164 from the RAM swap control couple one of the shared RAM's 141 or 142 to the transponder interface section 120 and the other shared RAM to the network interface section 121. By reversing the signals on the control lines the connection of the shared RAM's 141 and 142 is also reversed. In this manner, data stored in the shared RAM section 122 is exchanged between the two interface sections 120 and 121 of the transceiver control circuit 36.

Transponder Circuit

Figure 5:
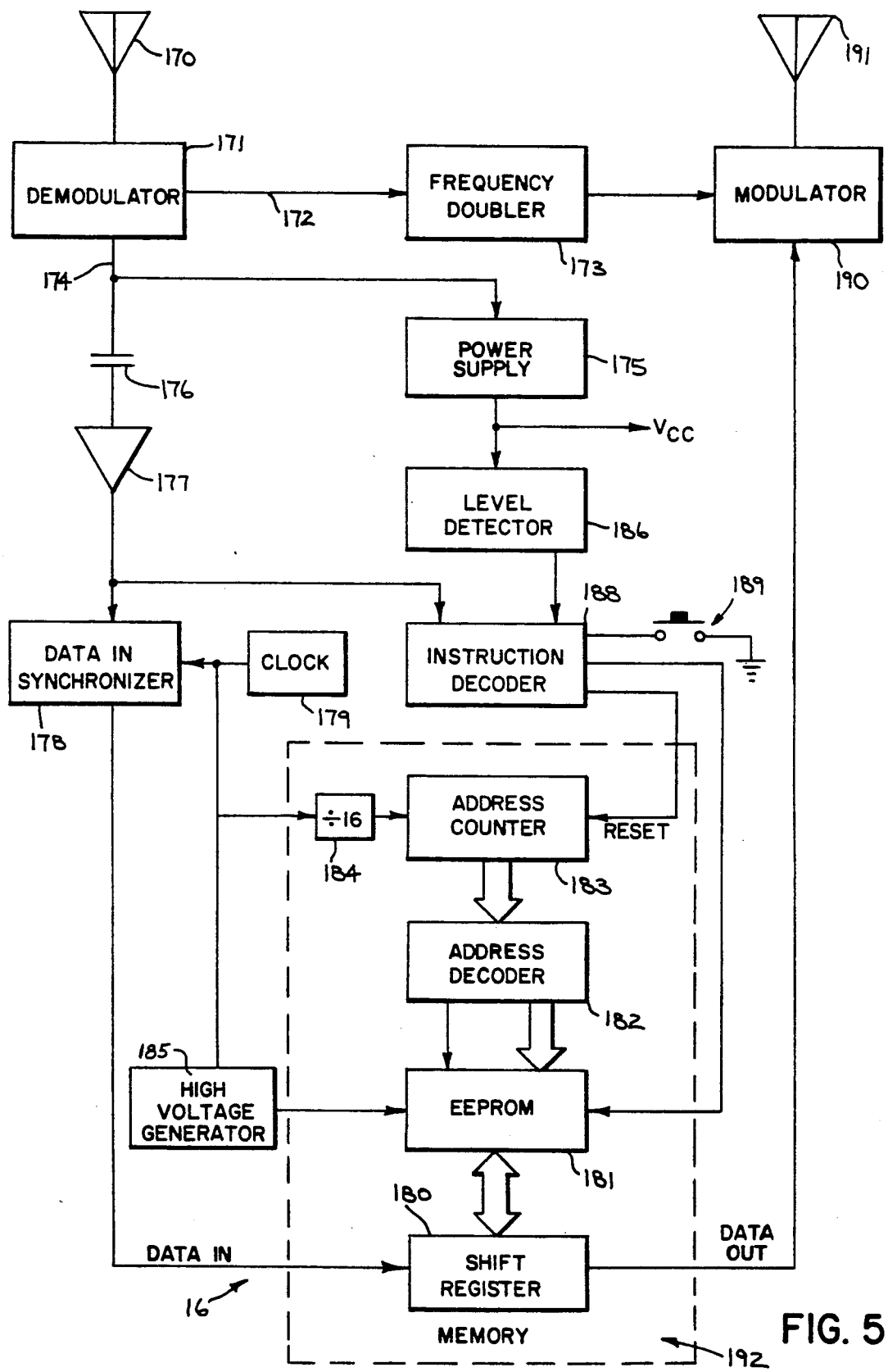
FIG. 5 is a block diagram of the transponder of the FIG. 1 system.

As noted above the transceiver 18 sends and receives data to and from the transponder 16. With reference to FIG. 5, the transponder 16 includes a receiving antenna 170 coupled to a demodulator 171. The demodulator incorporates a filter circuit tuned to 915 MHz, the carrier frequency of the transmitter 32 in the transceiver 18. The demodulator 171 has a first output 172 coupled to a frequency doubler 173. The frequency doubler 173 receives a 915 MHz signal from the demodulator 171 and produces an output carrier signal at 1830 MHz.

The demodulator 171 has a second output 174 at which it produces the detected modulation from the received signal. This second output 174 is connected to a power supply 175 which uses the D.C. component of the received signal to derive a D.C. voltage (Vcc) for powering the transponder 16. The magnitude of the D.C. voltage Vcc is directly proportional to the strength of the received signal. As an example, the minimum output from the power supply 175 necessary to power the transponder in the read only transmit mode is about 85 microamps at 1.5 volts.

The second demodulator output 174 is also coupled by a capacitor 176 to an amplifier 177. The output of amplifier 177 is connected to a data input synchronizer 178. The synchronizer 178 also receives the clock signal from a transponder clock signal generator 179. The clock signal controls the flow of data throughout the transponder 16. The synchronizer 178 uses the clock signal to synchronize the data flow from the demodulator to the clocking of the transponder's memory 192 thereby eliminating the need to recover the clock signal from the received data signal. The output of the synchronizer 178 is connected to the serial data input of a sixteen-bit shift register 180.

The memory 192 consists of the shift register 180, an electrically erasable programmable read only memory (EEPROM) 181, an address decoder 182, and address counter 183 and a frequency divider 184. The divider 184 produces an output pulse upon the occurrence of every sixteenth clock signal pulse. The address counter 183 receives the output signal from the divider 184 and increments its count upon the occurrence of each pulse of the signal. The output of the counter 183 is coupled by the address decoder 182 to the address input of EEPROM 181. The address decoder 182 interprets the addresses and generates control signals for the EEPROM 181 in a conventional manner.

The data terminals of the EEPROM 181 are coupled to the parallel I/0 terminals of the shift register 180. The serial data output terminal of the shift register 180 is connected to the input terminal of an RF modulator 190. The modulator has a carrier signal input terminal connected to the output of the frequency doubler 173. The data from the shift register's output amplitude modulates the 1830 MHz carrier signal and the output of modulator 190 is coupled to a transmit antenna 191.

The high frequency clock signal is coupled to a high voltage generator 185 which produces a high voltage (VPP) necessary for erasing and storing data in the EEPROM 181. This high voltage is applied to a terminal of the EEPROM 181.

The output of the power supply 175 is also coupled to a level detector 186 which senses when the voltage Vcc exceeds a given level. This level is above the minimum voltage required to power the transponder and is generated by the reception of a higher power signal at the receiving antenna 170. For example, the minimum voltage required to power the transponder is 1.5 volts and the level detector 186 responds to 3.5 volts.

When the supply voltage exceeds 3.5 volts a signal is sent from the level detector 186 to an instruction decoder 188. This signal activates the instruction decoder 188 to examine the output data from the amplifier 177 for two unique bit patterns which instruct the transponder to enter the WRITE or the INHIBIT WRITE mode. If the WRITE instruction is received, the instruction decoder 188 resets the address counter and sends a write signal to the EEPROM 181. When an INHIBIT WRITE instruction is received, the instruction decoder ignores all subsequent WRITE instructions until manually reset by switch 189.

Data Communication Formats

In order to explain the operation of the transponder 16 and transceiver 18 an understanding of how the data is exchanged between them is necessary.

Figure 6:
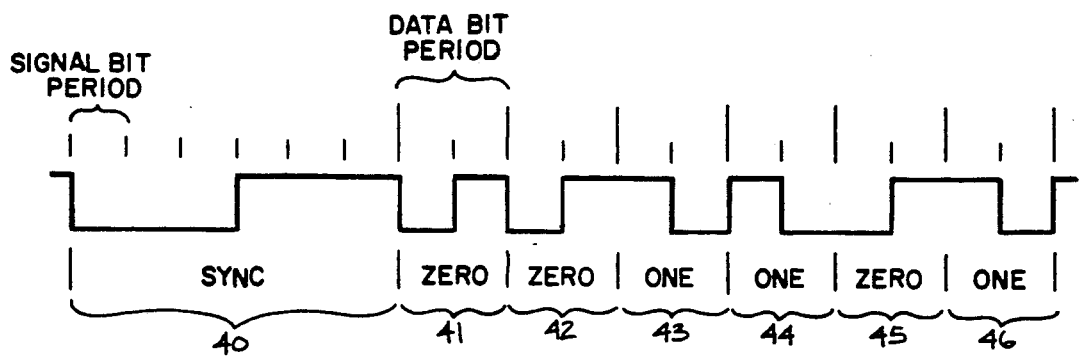
FIG. 6 is a waveform diagram of a Manchester encoded data signal.

FIG. 6 illustrates a sample waveform of the transmission of data to and from the transponder 16. The transmission is divided in time into a number of signal bit periods as delineated by the vertical lines above the waveform. The signal bit intervals are of equal length and the level of the RF signal varies from interval to interval in order to encode data on the signal. The transmission begins with a synchronization (sync) pulse field 40 which is six signal bit periods long. The sync pulse always consists of three consecutive low level signal bits followed by three high level signal bits.

Six binary data bits 41-46 are shown in FIG. 6 following the sync pulse. This six data bits represent the binary data 001101. The data bits are sent using Manchester encoding. The Manchester format encodes each data bit using two signal bits. Thus, the Manchester format data bit period is two signal bit periods long as denoted by the longer vertical bit period lines above the signal waveform. The Manchester encoding technique is characterized by a signal level transition always occurring in the middle of the Manchester data bit period. For example, the character in the first bit period 41 is a binary zero which consists of a low logic level signal bit for the first half of the Manchester period and a high level signal bit for the latter half. A binary one character is formed by the reverse levels as shown in the third data bit period 43. A signal level transition does not necessarily occur at the boundary between Manchester data bit periods. Transitions at these points depend upon the values of the adjacent data bits. Specifically, if the two data bits are the same, for example in Manchester data bit periods 41 and 42, a signal transition will also occur at the bit period boundary therebetween. However, if the adjacent data bits are dissimilar, for example in Manchester data bit periods 42 and 43, a transition in the signal does not take place at the boundary.

Each Manchester encoded data bit is represented by two signal bits representing the logic level of the data signal for each half of the Manchester bit period. The data signal received by the transponder 16 is stored in its memory 192 by sequentially storing each of the signal bits. For example, the data bit sequence 001101 illustrated in FIG. 6 is stored in the transponder memory as the signal bit sequence 010110100110. In the transmit mode, the transponder 16 uses the signal bits stored in its memory to modulate the carrier thereby producing a output signal with Manchester encoded data. By storing the transmission information as signal bits, rather than the actual data bits, the transponder 16 does not have to decode received data and re-encode it for transmission.

Data is exchanged between the transceiver 18 and the transponder 16 using one of three different data frame formats depending upon the amount of data necessary to identify the workpiece 14 and its characteristics. The first format contains six decimal digits of data. The remaining two formats carry 20 or 40 characters worth of data. Each character may be a decimal digit, an uppercase alphabetic letter, a space, a minus sign, an ampersand or an asterisk for a total of forty possible characters.

Figure 8:
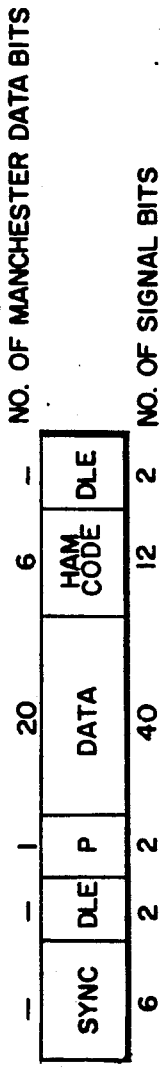
FIGS. 8, 9 and 10 respectively illustrate 32 bit, 128 bit and 256 bit data frames employed in transmitting data between the transponder and the transceiver.

The six-digit data frame is illustrated in FIG. 8. The frame begins with a six signal bit synchronization (SYNC) pulse field. The sync pulse, as shown in the waveform of FIG. 6, consists of a unique sequence of three low logic level signal bits followed by three high logic level signal bits. In order to insure that the sync pattern is clearly delimited, the two signal bits (DLE) immediately following the sync pulse are always a low and a high signal level respectively. The next Manchester data bit of the frame is a parity bit which may be either a one or a zero. Following the parity bit are 20 Manchester encoded data bits representing the transponder identification number or other numerical data. These 20 binary Manchester data bits correspond to a six-decimal digit number. The most significant data bit is transmitted first.

Following the 20 bits of data is a frame Hamming code consisting of six data bits. The frame Hamming code is generated using conventional techniques. Specifically, each bit position of the 20 bit data field is assigned a unique six-bit Hamming code. During the assembly of the frame to be transmitted for storage in the transponder, the frame Hamming code is initially set to zero and for each of the data bits that is set, its corresponding six bit Hamming code is exclusive OR'ed with the existing frame Hamming code. The final two signal bits of the frame form a delimiter (DLE) and are always a low and a high signal level respectively.

Figure 9:
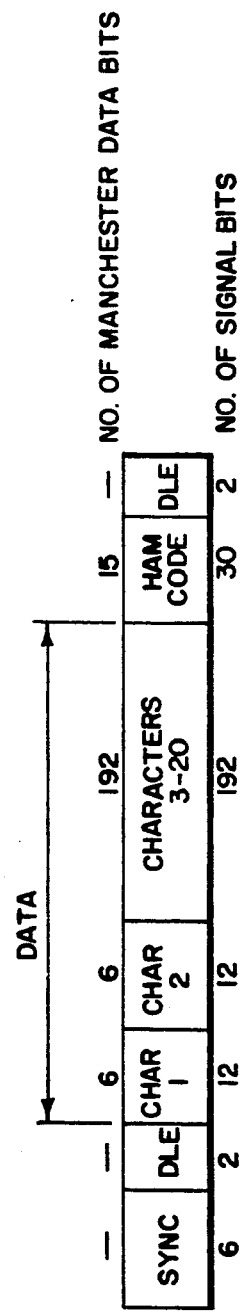

The data frame for the 20 character format consisting of 256 signal is shown in FIG. 9. It also includes of a synchronization pulse and a delimiter (DLE) as previously described with respect to the frame in FIG. 8. Following the delimiter are 108 binary Manchester encoded bits of data. The first six data bits of these 108 represent the first character of data. These six data bits are a binary number from decimal 0 to 39 which designates the particular character. Specifically, each of the 40 alpha-numeric and symbolic characters has been assigned a unique binary number. For example, the space character may be represented by the number zero, the ampersand may be represented by the number one, etc. The next six bits of the frame also represent a unique data character. The remaining data field characters are encoded using a data compression scheme in which each group of three characters is represented by a 16 Manchester bit pattern. Each of the three characters is encoded according to the following equation:

$$N = Char1(40^2) + Char2(40) + Char3$$

The numerical value for each of the three characters is the same numerical value used to encode the first two data characters of the frame. The number N resulting from the data compression process can be represented by 16 bits. Therefore, 96 bits are required to encode the remaining 18 characters. Following the data field is a 15-bit Hamming code field. The frame is terminated by a delimiter character.

Figure 10:
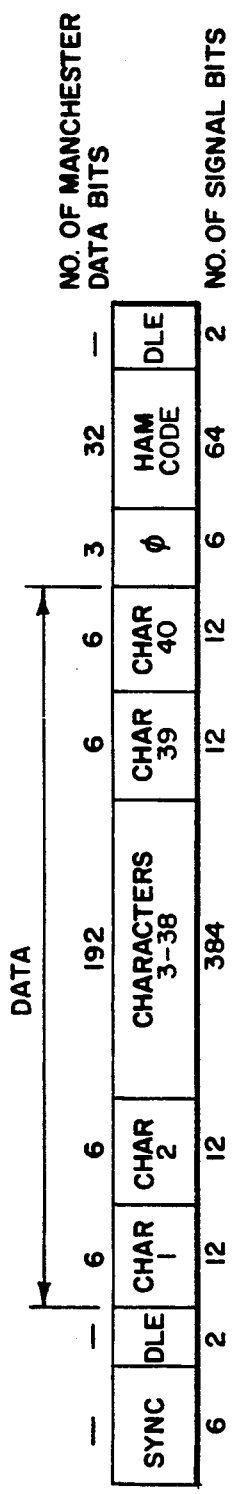

The 40 character data frame shown in FIG. 10 consists of 512 signal bits (256 Manchester data bits). As with the previous data frames, the 40 character frame begins with a previously described synchronization pulse and a delimiter character. The Manchester encoded data field of the frame consists of the first and second characters represented as a discrete number between decimal 0 and 39 using six Manchester bits each. The following 36 characters (characters 3-38) are encoded using the same data compression scheme as was used in the 20 character frame described above. The final two characters, characters 39 and 40, are represented as discrete numbers between decimal 0 and 39 using six Manchester encoded data bits each. The three Manchester data bits following the data field of the frame are unused and are set to zero. The three unused data bits are followed by a 32 Manchester data bit Hamming code. The 32 bit Hamming code is calculated by assigning a unique 32 bit code pattern to each of the 219 data bit positions and exclusive ORing the code for each bit position that is set. The frame terminates with a delimiter character.

When the transponder 16 is programmed with new data the data frames are repeated a number of times until the 512 bit EEPROM 181 within the transponder has been filled. For example, the six digit frame containing 64 signal bits is stored eight times within the transponder's memory. The 20 character data frame consisting of 256 signal bits is stored twice and the 40 character frame consisting of 512 signal bits is stored once within the transponder's memory 192. This is accomplished by transmitting the data frame the corresponding number of times to the transponder.

System Operation

When the transponder 16 is attached to a workpiece 14 it is usually reprogrammed with data for that workpiece. The transponder 16 is placed in the RF field of a programming transceiver 18. The data to be stored in the transponder is sent to the transceiver over the local area network 24 from a host computer (not shown). With reference to FIG. 3, the data is received by the NIP 150 in the transceiver's control circuit 36 and stored in a buffer area of the shared RAM 141 or 142 that is currently assigned to the network interface section 121. When all of the data has been stored in the shared RAM, the NIP 150 issues a "swap request" signal over line 161 to the RAM swap control 135. If the TIP 123 is not currently using the shared RAM section 122, it will be sending an active "swap ok" signal to the RAM swap control 135 on line 132.

If both of these signals are active the RAM swap control 135 reverses the signal levels on the two shared RAM control lines 143 and 164. The reversal of the signal levels swaps the connection of the shared RAM's 141 and 142 to the transponder and network interface sections' 120 and 121 sets of buses 124-126 and 151-153, respectively. This swap enables the transponder interface section 120 to access the data previously stored by the network interface section 121.

When the swap has been carried out both the TIP 123 and the NIP 150 receive swap done signals via control lines 133 and 162 respectively. In response to the swap done signal the TIP 123 checks the predefined buffer area in the shared RAM 141 or 142 for data to transmit to the transponder.

Upon finding data in the buffer, the TIP 123 begins executing a routine for transmitting data to the transponder 16 by pulsing the RF ENABLE signal. With reference to FIG. 4, this routine commences by storing a byte in the transmit data latch 102 to produce a high power level from the transmitter 32. The voltage at node 110 determines the transmitter's power and is inversely proportional to that power. The resistors 105-109 form a voltage summation network and the output levels from the transmitter latch 102 determine the voltage at the output node 110. Which one of higher the power levels is selected depends on the distance from the transceiver 18 to the transponder 16 and is defined during the set-up of the system. The characteristics of the format for the transmitter signal are stored in the RF EEPROM 130. The transmission format is configured in order to comply with the Federal Communications Commission regulations for this class of RF device. The transmitter is turned on, by a low level RF ENABLE signal, for an initial interval to power up the transponder 16. Next the TIP 123 transmits a memory write command to the transponder 16. For example, this command is transmitted as sequence of signal bits forming the pattern 0100011101.

Once the write command has been sent the data frame is transmitted. In doing so the sync pulse is sent first. The TIP 123 then begins to sequentially read each data bit from the buffer in the shared RAM and convert them into the corresponding Manchester formatted data signal (see FIG. 6). Depending upon the signal level for each half of the Manchester bit period a low or high level RF ENABLE signal is sent by the TIP 123 to the DPP 30 to turn on or off the transmitter 32. The pulsing of the transmitter sends the Manchester encoded data to the transponder 16.

With references to FIG. 5, when the transponder receives the high strength signal from the transceiver, the D.C. output from the power supply 175 will exceed 3.5 volts. The 3.5 volts or higher from the power supply 175 causes the level detector 186 to produce a signal which enables the instruction decoder 188. The instruction decoder 188 begins inspecting the incoming data from the demodulator 171 for the unique sequence of bits representing the memory write command. Once this sequence has been detected the transponder address counter 183 is reset and the EEPROM 181 is placed in the write mode. The higher received power in conjunction with the write command also activates the high voltage generator 185 to produce a voltage Vpp for reprogramming the EEPROM 181.

Each block of sixteen signal bits of data that is received is shifted into the shift register 180. When the shift register is full the sixteen signal bits are transferred in parallel into the EEPROM 181. The address counter 183 in then incremented to address the next storage location for the subsequent block of sixteen signal bits. This process continues until all the data is stored in the EEPROM.

Once the transponder 16 has been programmed it moves along the assembly line 12 with the workpiece 14 to which it is attached. The following is a description of the interrogation of a transponder 16 by another transceiver 18. With reference to FIGS. 1, 3 and 4, when the object detector 22 senses a workpiece 14 approaching the transceiver 18, a signal is sent to an input 131 of a port of the TIP 123. In response, the TIP 123 reads data from the RF EEPROM 130 which specifies the power level, duty cycle, and other parameters of the transmission to read the transponder 16. For the transponder read mode the TIP 123 loads a byte in the transmit latch 102 of the DPP 30 which places the transmitter 32 (FIG. 2) at a low output power level. The RF ENABLE signal then goes low placing node 110 at the voltage determined by the output of the transmitter latch 102. As a result RF carrier signal is transmitted by the transceiver 18.

With reference to FIG. 5, when the transponder 16 on the approaching workpiece 14 receives sufficient RF energy that its power supply voltage Vcc reaches a minimum of 1.5 volts, it will begin transmitting data from its memory 192. The address counter 183 is reset when the transponder is first activated. The signal from clock 179 causes the address counter 183 to increment once every sixteen pulses. The address counter output addresses the EEPROM 181 so that its stored signal bits are inputted into the shift register 180. The next sixteen clock pulses transfer the sixteen signal bits from the shift register to the modulator 190. Then another sixteen signal bits are transferred from EEPROM 181 to the shift register 180. As long as the transponder 16 is adequately powered by a received signal it repeatedly transmits the contents of its EEPROM 181. This means that for any given transmission the transponder sends numerous copies of the data frames stored in its memory. These signal bits modulate the 1830 MHz carrier signal from the frequency doubler 173 and the resulting signal is transmitted to the transceiver 18.

With reference again to FIGS. 3 and 4, the TIP 123 in the meantime prepares the receiver section of the DPP 30 to process the data from the transponder 16. As noted previously, the high data rate of the signal from the transponder 16 makes circuitry for real time Manchester signal decoding extremely complex. Therefore, the DPP 30 stores the time intervals between signal level transitions in the received signal from the transponder 16. Then the control circuit 36 software routine interprets the intervals to recover the transmitted transponder identification data.

To activate the DPP processing of received data, a high level DPP enable signal (DPPEN), a high level receiver enable signal (RX EN), and a high level DPP SELECT signal are generated by the TIP 123. The DPPEN signal goes high for 5 milliseconds defining a time window during which data from the transponder 16 is captured by the transceiver 18. This period may vary, however it must be long enough to insure that sufficient signal data is received for data decoding and verification purposes. In addition the interval is selected so that the system will comply with the FCC regulations for this device class. The previously low DPPEN signal had reset the first one-shot 60. The low to high transition of DPPEN sets the first flip-flop 53. The transition at the not Q output of the first flip-flop 53 produces a brief high output pulse from first exclusive OR gate 54. This brief pulse resets the DPP address counter 91 to zero. The trailing edge of the pulse from the first exclusive OR gate 54 triggers the first one-shot 60 to begin its two millisecond timing pulse.

The high Q output from the first flip-flop 53 enables the second flip-flop 70 to produce the DPP CLOCK signal and its inverse from the system clock signal. The pulses of the DPP CLOCK signal are counted by decade counter 72 and the pulses of the inverse DPP CLOCK signal are counted by the eight-bit counter 66. The function of the decade counter 72 is to control the timing of the storage of transition intervals from the eight-bit counter 66 into the DPP RAM 92. Although the decade counter 72 begins operation immediately upon activation of the DPP circuit, the fourth flip-flop 90 inhibits data storage in the DPP RAM 92 until a transition in the received transponder signal is detected. Specifically the fourth flip-flop 90 prevents incrementation of the address counter 91 until a transition is detected.

Figure 7:
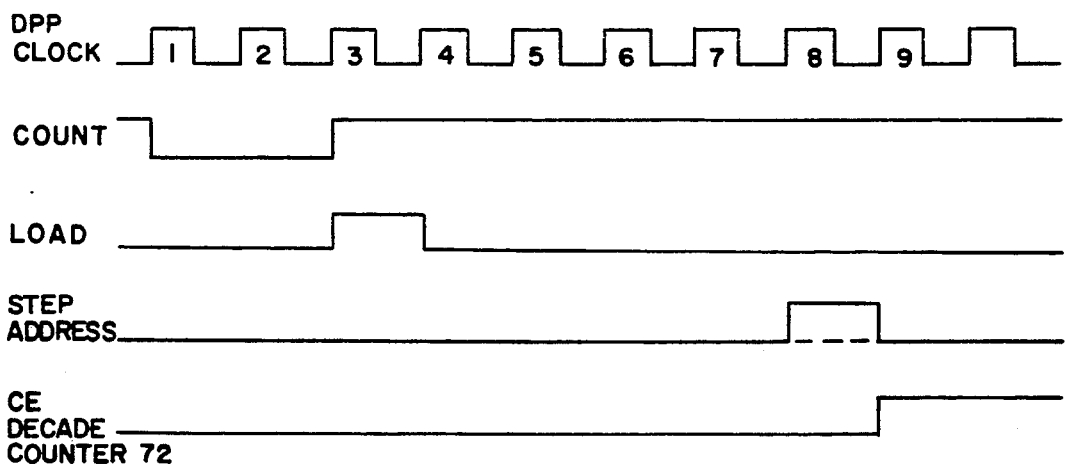
FIG. 7 is a set of waveforms at different points in the circuit of FIG. 4.

The demodulated transponder data signal (RX Data) from receiver 26 (FIG. 2) is applied to the second AND gate 74. The high level receiver enable signal (RX EN) also applied to the second AND gate 74 causes the received data signal to be passed to the transition edge detector 75. Assuming that data is being received from the transponder, the edge detector 75 will produce a high output pulse upon each occurrence of a transition in the Manchester encoded data signal. This pulse is inverted by inverter 77 and resets the second flip-flop 70. The output of the edge detector 75 also resets the decade counter 72. The decade counter counts the next nine pulses of the DPP CLOCK signal from the second flip-flop 70. For the first two DPP CLOCK pulses, one of the outputs for the counts of "1" or "2" will be high producing a low COUNT signal from the first NOR gate 78, as shown in the waveforms of FIG. 7. The low COUNT signal disables the eight-bit counter 66 freezing its count. In addition, since the Q output of the third flip-flop 79 is now low, the low COUNT signal produces a low level at the output of the third NOR gate 82. This low output places the RAM 92 in the write state. At this time, the output of the eight-bit counter 66 is being applied by buffer 96 to the data terminals 95 of the RAM 92. Therefore, the output of the counter 66 is stored in the RAM location addressed by address counter 91. The eight-bit counter is held frozen for a long enough interval so that its previous count can be stored in the DPP RAM 92.

At the third DPP CLOCK pulse the COUNT signal from the first NOR gate 78 goes high clocking the third flip-flop 79 and again enabling the eight-bit counter 66. At this time, the "3" output of the decade counter 72 goes high which is inverted to produce an active low level LOAD signal for the eight-bit counter 66. The eight-bit counter is configured to load the value of three in its registers in response to the a low level LOAD signal. This count loading restores the contents of the eight-bit counter 66 to the value it would have if its counting of clock pulses had not been inhibited for the RAM storage operation.

At the eighth DPP CLOCK pulse following the received signal transition, the "8" output of the decade counter 72 goes high. Both inputs to the third AND gate 88 are now high, producing a high level at the corresponding input to the fifth NOR gate 87. In this mode, the ADVANCE MEMORY signal from the TIP 123 is low. When the number "8" output from the decade counter 72 goes low at the next DPP CLOCK pulse, the fifth NOR gate 87 output goes high, clocking the address counter 91 to address the next location in RAM 92.

When the number "8" output again goes low the third flip-flop 79 is reset and the fourth flip-flop 90 is clocked producing a high Q output. At the ninth DPP clock pulse, the "9" output of the decade counter 72 goes high. This output is coupled to the first AND gate 68 which also receives the then high DPP DONE signal. As a result when the "9" output goes high, the signal at the active low count enable input (CE) of the decade counter 72 goes high inhibiting its operation.

The eight-bit counter 66 continues to count the inverse DPP CLOCK pulses from the second flip-flop 70. Once the count of the eight-bit counter reaches 32, the sixth output bit line 67 goes high. This line 67 is coupled via the network consisting of capacitor 93 and resistor 59 to an input of the second exclusive OR gate 58. This coupling creates a pulse which resets the first one-shot 60 before it times out. This reinitializes the two millisecond timeout period.

If the data rate of the received signal is above the range of transponder data rates, the widths of the internals between level transitions will be less than 32 clock pulses wide. Therefore the eight-bit counter 66 will never reach 32 and the timeout period will not be reset. Therefore at the end of two milliseconds, the first one-shot 60 times out, triggering the second one-shot 64. The low level pulse at the not Q output of the second one-shot 64 generates the DPP DONE signal at terminal 69 which signals the TIP 123 that the DPP 30 has completed its processing. The low pulse from the second one-shot 64 also clocks the first flip-flop 53 to set and inhibit the operation of the second flip-flop 70. The low level DPP DONE pulse also clears the eight-bit counter 66. The low DPP DONE signal is coupled via the first AND gate 68 to the eight-bit counter 66 rendering it continuously enabled. This causes a series of ZEROES to be stored in consecutive locations of DPP RAM 92. These zeroes provide an end of data marker.

Assuming that valid data rate is being received, at the next transition in the received signal, the output of the edge detector resets the decade counter 72. This resets the "9" output low enabling the counter's operation. At the next DPP CLOCK pulse, the "1" output goes high producing a low level COUNT signal from the first NOR gate 78. This signal as noted before freezes the eight-bit counter 66 and causes the count to be stored in DPP RAM 92. This interval timing process continues to be repeated for each subsequent transition of the received data signal.

If a subsequent transition does not occur, the eight-bit counter 66 will keep incrementing at every DPP CLOCK pulse. The transitions of the sixth output bit of the counter 66 will keep resetting the first one-shot 60 so that it never times out. When the eight-bit counter 66 reaches a count of 256, the carry out goes high. Under normal conditions the counter 66 should never reach 256 as this period is longer than the longest transition interval. However, if the signal is lost or if the received signal data rate is too low the period between transitions will exceed 255 clock pulse periods. The carry output is coupled by the inverter 98 to the second enable terminal EN2 of the eight-bit counter 66, applying a low level to the terminal. This low level disables the operation of the counter 66. The low output from the inverter 98 also resets the fourth flip-flop 90 inhibiting the clocking of address counter 91.

With the eight-bit counter 66 disabled after a carry, its count is held at zero. Therefore, subsequent transitions of the received data signal store a zero in the DPP RAM 92. With the eight-bit counter 66 disabled no further resetting of the first one-shot 60 will occur. As a consequence, the first one-shot 60 will time out, generating the DPP DONE signal from the second one shot 64. The effect of the DPP DONE signal is the same as that described above.

If signal level transitions continue to be detected, the DPP RAM will eventually store 2048 transition intervals. At this time, the twelfth output bit line 99 of the address counter 91 will go high. This output line 99 is coupled to the rising edge trigger input (A) of the second one-shot 64, which triggers the second one-shot 64 to produce the low level DPP DONE pulse. The received signal transition interval data in the DPP RAM 92 will represent several copies of the data frame sent by the transponder 16.

As noted above the DPP enable signal DPPEN from the TIP 123 is active for 5 milliseconds. If a low DPP DONE signal is not produced during this period, the falling edge of the DPPEN pulse resets the first one-shot 60. This resetting triggers the second one-shot 64 producing the active DPP DONE signal.

When the TIP 123 receives a low level DPP DONE pulse from the DPP 30, it produces a high level RF ENABLE signal which is applied to transmit node 110 turning off the transmitter 32. When the DPP DONE pulse goes high again, the transponder control circuit 36 can begin accessing the received signal data stores in the DPP RAM 92 for decoding. The control circuit 36 then sends low level DPP EN and RX EN signals disabling the DPP 30. The DPP circuit is then configured by the control circuit 36, specifically by the transponder interface processor TIP 123, to enable the TIP to read data from DPP RAM 92. The transition data is read from the DPP RAM 92 and decoded to recover the Manchester encoded data characters. The read out and decoding continues until two identical data frames are found stored in the DPP RAM. Once two identical frames are found, the TIP 123 knows that the data has been properly received from the transponder 16. If an end of data marker (a zero) is found before two identical frames occur, the TIP 123 will immediately commence another interrogation of the transponder. The operator can define the overall time period during which the transceiver will continue to attempt to receive valid data from the transponder.

Figure 11:
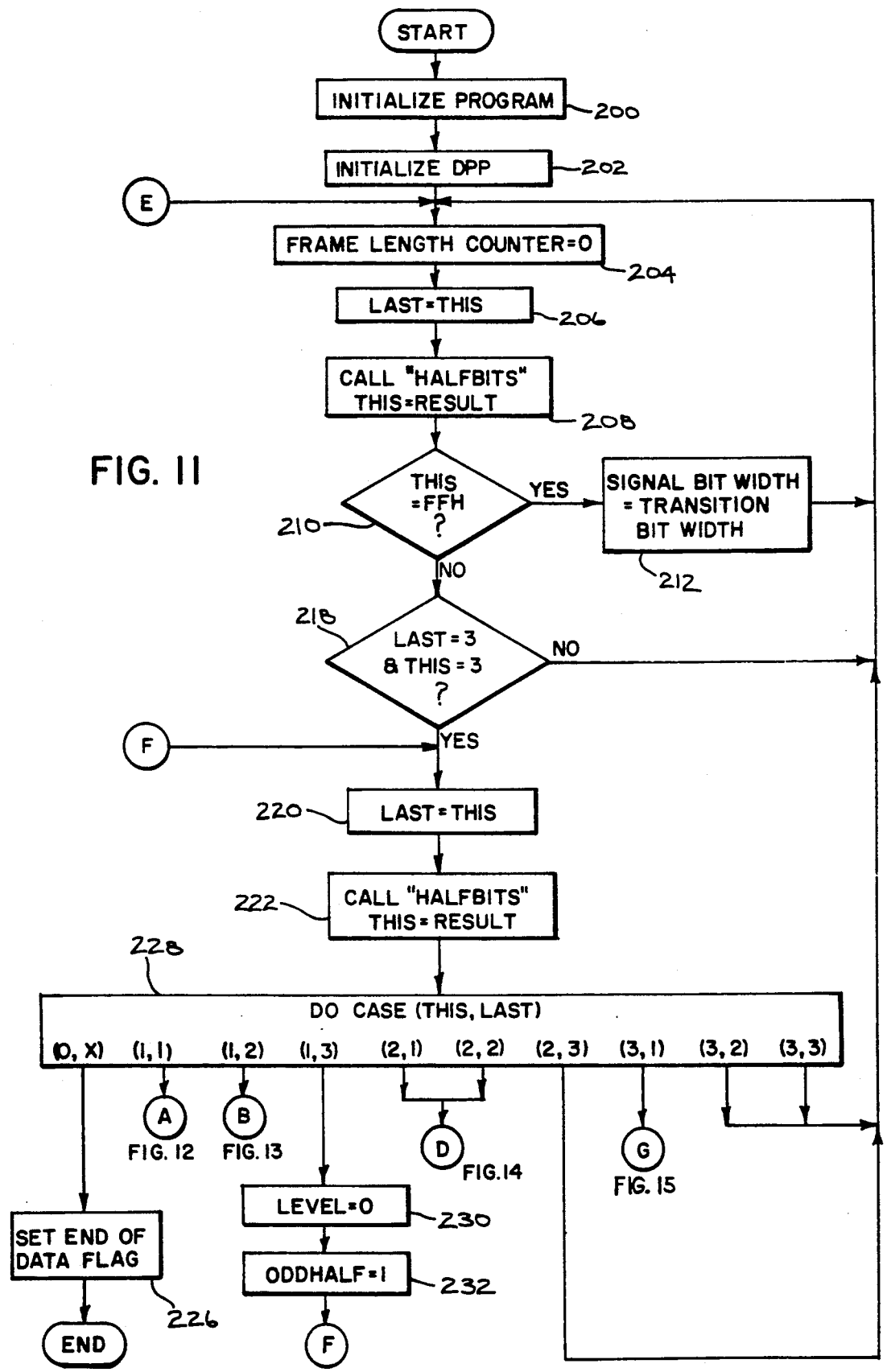
FIGS. 11-15 are sections of a flow chart for the program which decodes the data received by the transceiver to recover the digital data encoded on the signal.

The processing of the stored signal data is performed by a data interpretation program which is stored in TIP program ROM 127 shown on FIG. 3, is illustrated by the flow chart beginning in FIG. 11. At the first step 200 of the data interpretation program the TIP 123 initializes the various counters, flags, and variables that are stored in the TIP RAM 129 for use in the interpretation program. Then the TIP 123 initializes the DPP 30 by activating the control signal lines to set the DPP 30 in a mode in which the TIP may read the contents of the DPP RAM 92. Specifically, the DPPEN and RX EN control signals are placed at a low logic level to disable the DPP 30 from processing any data that may be sent from the receiver 26. The transition of the DPPEN signal causes a resetting of the address counter 91 to zero. The RF ENABLE signal is placed at a high logic level to turn off the transmitter 32 so that any transponder 16 within the range of the transceiver 18 will not be energized. The DPP SELECT signal is placed at a low logic level to disable the counter buffer 96 in the DPP circuit 30 shown in FIG. 4 and enable the set of transmission gates 101 that are coupled to the data bus 126 of the control circuit 36 so as to connect the output of the DPP RAM 92 to this data bus. The low level DPP SELECT also sets the Q output of the third flip-flop 79 so that a count output from the decade counter 72 will not effect the level of the signal applied to the write enable terminal of the DPP RAM 92.

The TIP 123 then periodically sets the READ signal to the DPP 30 at a low level whenever it seeks to read the contents of the DPP RAM 92. When the READ signal is low, the output of the first address location of the DPP RAM 92 is coupled via the set of transmission gates 101 to the data bus 126 in the transponder interface section 120 of the control circuit 36. To advance the address counter 91 to access the next location in DPP RAM 92, the TIP 123 pulses the ADVANCE MEMORY signal applied to terminal 93.

The transponder interface section 120 executes a software program which examines consecutive transition intervals stored in the DPP RAM 92 to recover the digital data characters sent by the transponder 16. By examining the length of time between transitions of the Manchester encoded signal, the TIP 123 can determine if the data signal made a transition at the boundary between the consecutive Manchester data bit periods. As shown in the waveform of FIG. 6, a transition at the boundary occurs only if the two consecutive data bits are the same. Therefore by knowing the value of the previous data bit and whether a transition occurs at the next data bit period boundary, the value of the next data bit can be determined.

After the DPP 30 has been initialized, the signal level transition interval widths stored in the DPP RAM 92 are read out until the beginning of a data transmission frame is found. As described above with reference to the waveform depicted in FIG. 6, each data frame begins with a sync pulse field that consists of three low level signal bits followed by three high level signal bits.

The sync pulse is found by sequentially examining consecutive transmission intervals stored in the DPP RAM 92 until a pair is found as described above.

Initially a location in TIP RAM 129, which stores a count of the number of data bits decoded from the transmission frame (i.e. the frame length), is reset to zero at step 204 of FIG. 11. Two variables, designated THIS and LAST, are set up to hold the width of the current and previous transition intervals. The widths are in terms of the number of signal bit (or half Manchester data bit) periods. At step 206 the variable LAST is set equal to the variable THIS. At step 208, a subroutine designated "HALF-BITS" is called which reads width of the the next transition interval stored in the DPP RAM in terms of pulses of the DPP CLOCK signal and converts the width into the number of signal bit periods.

Figure 16:
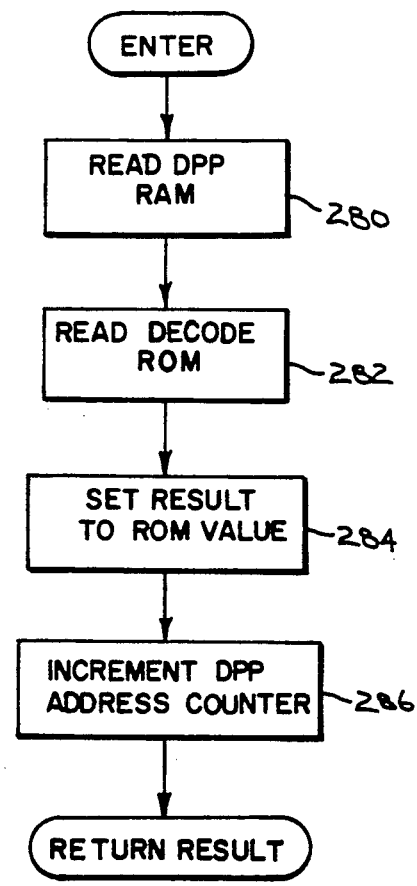
FIG. 16 is a flow chart of a subroutine that is called by the main program flow chart depicted in FIG. 11.

The HALFBITS subroutine is illustrated in the flow chart of FIG. 16. With reference also to FIGS. 3 and 4, the TIP 123 reads the measured transition interval width from the DPP RAM 92 at step 280. The TIP RAM 129 contains the number of DPP clock pulses which occur during a signal bit period. This number of clock pulses varies depending upon the data rate of the transponder signal. Initially this number is set to the maximum number of clock pulses that can occur in half a signal bit period, i.e. the number of clock pulses for the slowest data rate. The number of DPP clock pulses per signal bit period is dynamically adjusted during the signal processing until it is the proper value.

The measured transition interval width and the predetermined number of DPP clock pules in a signal bit period are employed at step 282 to address a two dimension look-up table in the data decode ROM 128. The value stored at each location in the look-up table is the quotient of the transition interval divided by the signal bit period, both intervals being measured in terms of DPP CLOCK pulses. The quotient value from the data decode ROM 128 is stored at step 284 in a location in the TIP RAM 129 designated to store the result of the HALFBITS subroutine. This result has one of hexidecimal values given by the following table:

| Result | Meaning |
| --- | --- |
| 00H | end of data marker |
| 01H | one signal period long |
| 02H | two signal periods long |
| 03H | sync field pulse |
| FFH | less than one signal period |

The TIP 123 then at step 286 increments the DPP address counter by applying a high level ADVANCE MEMORY signal pulse to terminal 93 of the DPP 30. The HALFBITS subroutine then returns to the calling point in the main routine (step 208 of FIG. 11) and the variable THIS is set equal to the result from the subroutine.

The TIP 123 then at step 210 checks if the value of THIS equals the hexidecimal number FF (FFH) which indicates that the processed transition interval is significantly shorter than the current width chosen for the signal bit period. For example, if the difference is greater than ten percent of the signal bit period, the result is set to FFH. Otherwise if the transition interval is within plus or minus ten percent of the signal bit period, the result is set to 01H. The FFH result also indicates that the current value chosen for the number of DPP clock pulses in the signal bit period is too large to properly decode the signal. Therefore, in this situation, the number of pulses per signal bit period that is stored in the TIP RAM 129 is set to the number of DPP clock pulses for the current transition internal at step 212. The program then returns to step 204 where the new signal bit period pulse number is used to attempt to decode the signal. In this manner the decoding process is adjusted so that different data rate transponder signals can be accommodated.

As long as a transition interval conversion can be carried out by the HALFBITS routine, the program advances from step 210 to decision block 218 where the values of THIS and LAST are checked. Both LAST and THIS will have the value of three when the sync pulse is found. If they are not equal to three the program returns from block 218 to step 204 to continue searching for the sync pulse in the DPP RAM interval data.

When the sync pulse is found, the program advances to step 220 and a portion of the program where the transition intervals are decoded to recover the data from the transponder 16. At step 220 the value of the variable LAST in TIP RAM 129 is set equal to the value of the variable THIS. The TIP 123 then executes the HALFBITS subroutine at step 222. At the completion of step 222 the variable THIS equals the width of the next transition interval in terms of signal bit periods and LAST is equal to the width of the previous transition interval.

The program next advances to a "case" section at step 228 where the two consecutive transition intervals, THIS and LAST are examined. Depending upon the values of these two variables, as indicated by the numbers in the parentheses at step 228, the program advances to the corresponding branch.

The combinations of (THIS and LAST) of (2,3) and (3,2) are invalid and never occur in a properly received and decoded Manchester transmission frame. When one of these conditions occurs the decoding of the transition intervals is aborted and the program returns to step 204 to search for another sync pulse in the received signal data. Although a (3,3) combination of THIS and LAST occurs when the sync pulse is encountered it indicates an error at this point, as it should have been detected at step 218. Whenever THIS equals zero width, an end of data marker has been encountered and a flag is set at step 226 before the decoding program ends without having found a valid data frame.

When the case is executed after a sync pulse is encountered, the value of LAST is three representing the transition interval for the last half of the sync pulse 40 (see FIG. 6) and THIS equals one for the first half of the zero delimiter character period 41. Therefore case (1,3) will exist and the program will advance to step 230 on the flow chart of FIG. 11. A variable designated LEVEL representing the value of the decoded data bit is set equal to zero. At step 232 a variable designated ODDHALF is set equal to one to indicate that the transition interval for the first half of the Manchester bit period has been processed.

The program execution then returns to step 220 where LAST is set equal to the value of THIS (i.e. one) and at step 222 the variable THIS is set equal to the next transition interval in DPP RAM 92. With reference to the data transmitted by the waveform example in FIG. 6, THIS now also equals one (i.e. the length of the second half of the delimiter character 41). Therefore the case step 228 will advance to the branch for case (1,1).

It should be noted that the characters in periods 42-46 vary depending on the data being sent. Therefore if bit period 42 contained a one the case (2,1) would be executed.

Figure 12:
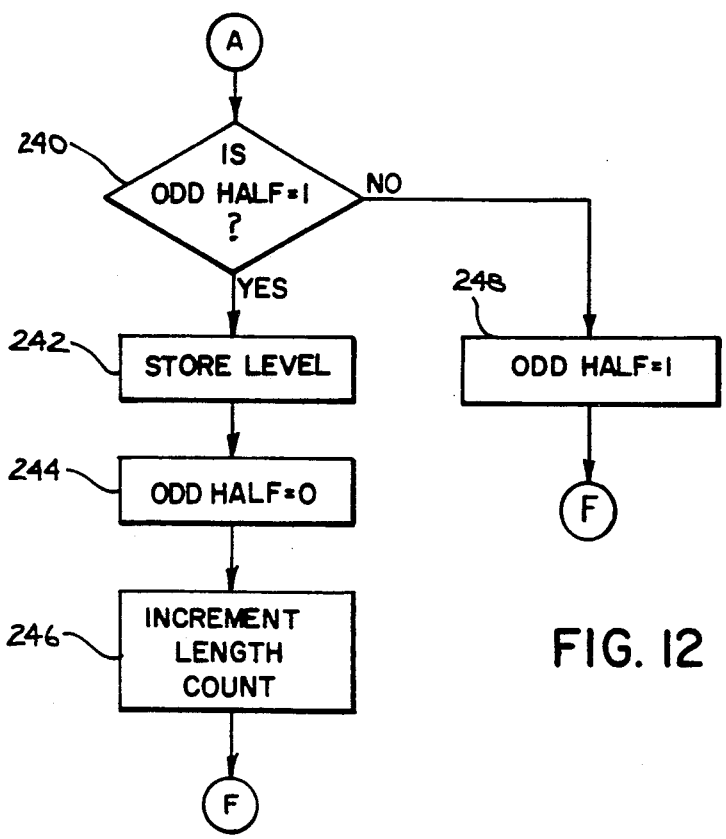

The flow chart for the (1,1) case branch is shown in FIG. 12. It begins at step 240 where the value of the variable ODDHALF is examined, if it equals 1 indicating that the value of LEVEL represents the value of the current data bit, the value of LEVEL is stored at step 242 in the next memory location of a data buffer in the TIP RAM 129. The RAM address then is also incremented at step 242. The value of ODDHALF is reset to zero at step 244 and the frame length count, which indicates the number of data bits decoded, is incremented at step 246.

When the next transition interval representing the first half of the second data bit 42 in the waveform of FIG. 6 is processed, the case will remain at (1,1). However this time when the branch of the flow chart depicted in FIG. 12 is executed, the value of ODDHALF is zero. Therefore, ODDHALF will be set to one as step 248 and the program will return to step 220 to examine the next transition interval.

Figure 14:
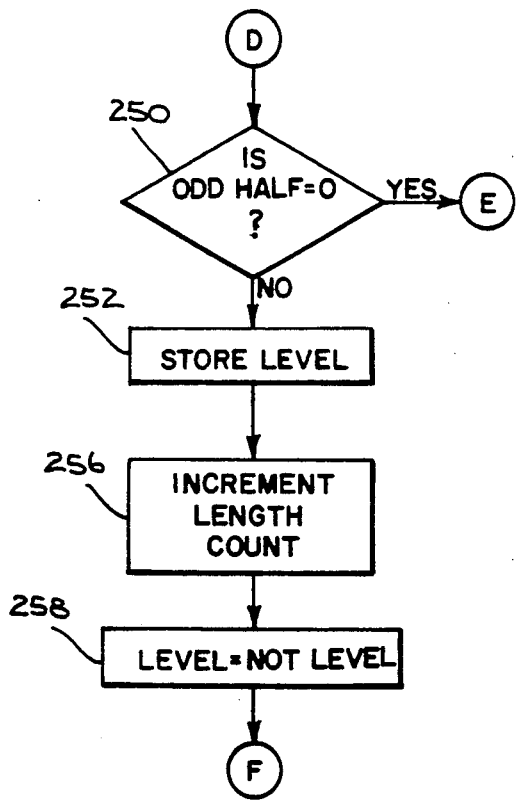

The next transition interval is two signed bit periods and spans the boundary between the second and third data bit periods 42 and 43 of the exemplary waveform in FIG. 6. This produces the case (2,1) at step 228 of FIG. 11. Therefore the case branch represented by the flow chart in FIG. 14 will be executed by the TIP 123. This case branch is also executed for the (2,2) case as occurs when the interval spanning Manchester data bit periods 45 and 46 is processed. At decision block 250 the value of ODDHALF is tested by the TIP 123. The case (2,1) or (2,2) can never legitimately occur when ODDHALF is zero. Therefore in this situation the program returns to step 204 (FIG. 11) to search for another sync field in the DPP RAM 92.

In the present situation ODDHALF is set to one and at step 252 the TIP 123 stores the current value of LEVEL (i.e. zero) in the data buffer of the TIP RAM 129. The buffer now contains two zeroes representing the first two data bits of the FIG. 6 waveform. The length count is incremented at step 256 to indicate that two bits have been stored in the data buffer. Since whenever THIS equals two a change in the data bit values has occurred the TIP 123 inverts the binary value of the LEVEL variable, in this instance changing it to a one at step 258. The program next returns to step 220 to set the variable LAST equal to THIS and to obtain the width of the next signal transition interval.

Figure 13:
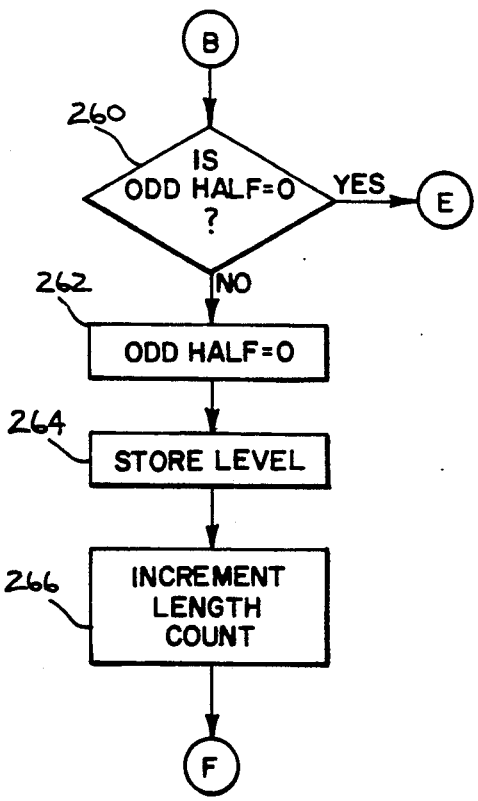

The next transition interval represents the last half of the third Manchester bit interval 43 in the waveform of FIG. 6 and produces the case (1,2) at step 228 in FIG. 11. This case causes the program to branch to the section represented by the flow chart on FIG. 13. At step 260 the value of ODDHALF is tested. If it is zero, an invalid condition exists and the program returns to step 204 (FIG. 11) to search for another sync field.

If ODDHALF equals one, which normally is the case, the branch execution advances to step 262 where the value of ODDHALF is reset to zero. The current value of LEVEL (i.e. one) is stored in the data buffer in shared RAM 141 or 142 at step 264 and the frame length count is incremented to three at step 266. The program execution then returns to step 220 (FIG. 11) to evaluate the next transition interval.

The process of evaluating each set of contiguous transition intervals continues until either the end of the transition data marker or another sync pulse is encountered. The end data marker occurs when a zero length transition interval is detected (THIS is equals OOH) at step 224 of FIG. 11 and the end of data flag is set step 226 before the routine ends.

Figure 15:
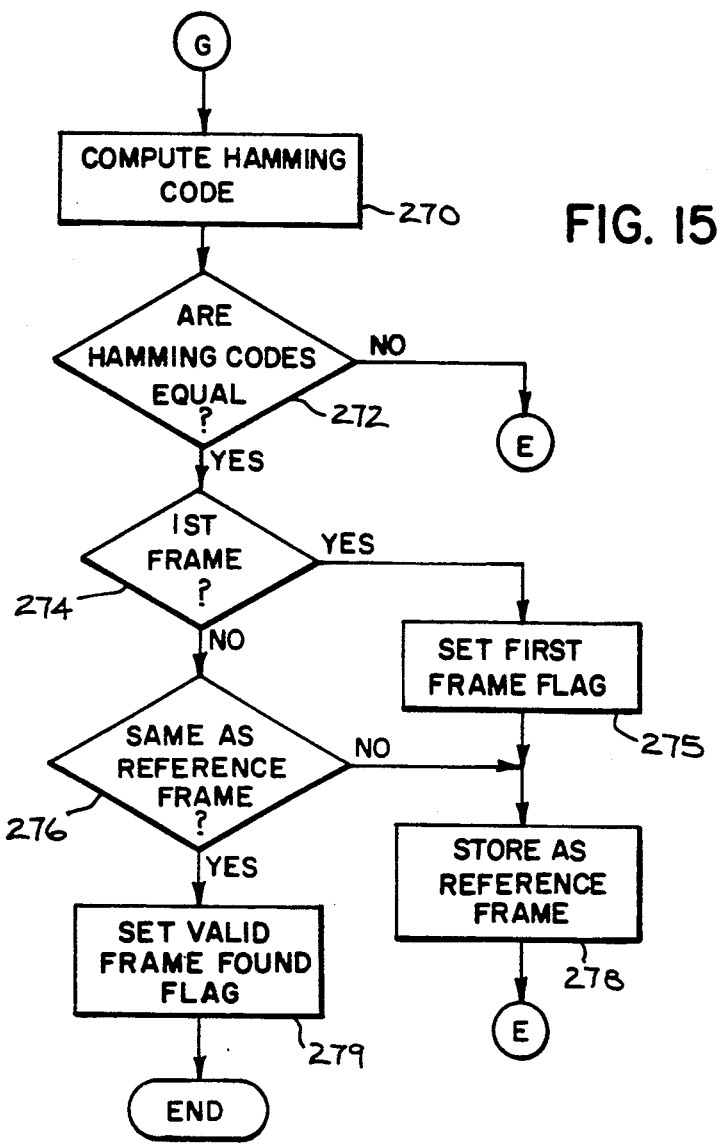

When another sync pulse is encountered, the case (3,1) will exist as the last bit of the data frame is always a zero delimiter (see FIGS. 8-10). The (3,1) case advances the program to step 270 at the beginning of the flow chart shown in FIG. 15. At this point, the TIP computes the Hamming Code for the data in the received frame. This computed Hamming code is compared at step 272 to the Hamming code transmitted with the frame. If the two codes are not equal, an error occurred during the transmission or decoding. The frame is discarded and the processing returns to step 204 (FIG. 11) to look for another frame in the received signal data stored in the DPP 30.

If the computed and transmitted Hamming codes are found to be equal at step 272, a flag is examined by the TIP 123 as step 274 to determine if this is the first frame found in the received signal data. This flag was reset at the initialization of the decoding program at step 200. If the current frame is the first one, the first frame flag is set at step 275. The frame is stored as a reference frame in a data buffer in the shared RAM 141 or 142 that is currently assigned to the transponder. The program then returns to step 204 to search for another frame in the received signal data in the DPP.

If the current frame is not the first one found, this frame is compared at step 276 to the reference frame to see if they are identical. This is accomplished by comparing the Hamming codes for the two frames. If the codes match, then two identical frames were received during the same transmission providing a verification that the reference frame contains valid data from the transponder. A flag to this affect is set at step 279 and the interval processing program ends.

If the two frames are not found to be identical at step 276, the latest one is stored in the shared RAM 141 or 142 as the reference frame at step 278 replacing the previous reference frame. The decoding program then returns to step 204 to look for another message frame.

With reference to FIG. 3, when the TIP 123 has satisfactorily completed processing a verified frame of received data, it initiates a swap of the shared RAM's 141 and 142. This is accomplished by the TIP 123 sending an active "swap request" signal over line 134 to the RAM swap control 135. If the network interface processor NIP 150 is not currently utilizing its assigned shared RAM 141 or 142, it will be sending an active "swap ok" signal via line 163 to the RAM swap control 135. When both of these signals are active, the RAM swap control will invert the current signal levels on shared RAM control lines 143 and 164. The inversion of these control line signals reverses the connection of the shared RAM's 141 and 142 to the transponder interface section 120 and the network interface section 121.

After the RAM swap, the NIP 150 can access the received data stored in the reference frame data buffer of the shared RAM 141 or 142 that was previously coupled to the TIP 123. The NIP 150 sequentially reads the data from the data buffer and sends it over the local area network 24 via the LAN driver 39 to the host computer.

What is claimed is:
1. A transponder comprising:

a means for demodulating a received signal to produce a data signal in which each data character is encoded as a pair of different signal levels;

an instruction decoder for detecting an operation instruction in the data signal;

a means for storing indicium of each signal level of the data signal, and having one mode of operation in which the indicia of each signal level is written into said means for storing in response to a signal from said instruction decoder, and having another mode of operation in which previously stored indicia are read from said means for storing;

a modulator for modulating a carrier signal in response to he indicia read from said means for storing; and means for powering the transponder with energy from the received signal.

2. The transponder as recited in claim 1 further comprising means for detecting the strength of the received signal and enabling the modulator when the strength is above a first magnitude.

3. The transponder as recited in claim 2 wherein said detecting means further includes means for enabling the instruction decoder when the signal strength is above a second magnitude.

4. The transponder as recited in claim 1 further comprising a clock signal generator.

5. The transponder as recited in claim 4 wherein said means for storing comprises:
an address counter which counts the cycles in an output signal from said clock signal generator;
a memory having a set of address inputs coupled to the output of said address counter and having a write enable input coupled to the instruction decoder; and
a shift register having a set of parallel data input/output terminals coupled to the data terminals of said memory, and a means for inputting serial data from said means for demodulating into said shift register and outputting serial data to said modulator.

6. The transponder as recited in claim 4 further comprising means for generating a programming voltage for said memory.

7. The transponder as recited in claim 1 wherein said instruction decoder includes means responsive to an operation instruction in the data signal to inhibit subsequent operation instructions in the data signal from causing the instruction decoder to place said means for storing into the one mode of operation.

8. The transponder as recited in claim 1 wherein:
said means for demodulating includes means for recovering the unmodulated carrier of the received signal; and
said modulator includes means for changing the frequency of the recovered carrier and using the changed carrier as the carrier signal for the modulator.

9. An object identification transponder comprising:
a means for demodulating a signal received by the transponder to recover data transmitted on the signal;
a means for detecting the strength of the received signal;
a memory for storing the recovered data;
a memory for storing the recovere
a modulator for modulating a carrier signal with data from said memory; and a means for controlling the operation of the transponder in response to the means for detecting the strength of the received signal, said controlling means placing the transponder in a first mode wherein the recovered data is stored in said memory when the strength of the received signal is greater than a first magnitude and placing the transponder in a second mode wherein the modulator modulates the carrier signal when the strength of the received signal greater than a second magnitude.

10. The transponder as recited in claim 9 wherein the first magnitude of signal strength is greater than the second magnitude.

11. A transceiver for an object identification system in which a transponder transmits a data signal in which data characters are each encoded as a pair of different signal levels, said transceiver comprising:
means for receiving the transponder data signal;
means for measuring the time interval between transitions in the level of the data signal from the transponder;
means for comparing two consecutive time intervals to recover a transmitted data character.

12. The transceiver as recited in claim 11 further comprising a clock signal generator; and wherein said means for measuring comprises means for counting the number of cycles of the clock signal from said generator that occur between the transitions in the level of the data signal.

13. The transceiver as recited in claim 12 wherein each signal level of a data character is transmitted for a fixed interval of time; and said means for measuring the time interval between the transitions further comprises means for converting the count of the clock cycles between the transitions into the number of the fixed intervals which occur between the transitions.

14. An object identification system having a transponder, and a transceiver for interrogating the transponder and receiving data therefrom wherein,
said transponder comprises:
means for receiving a signal from a transceiver in which the data characters are each encoded as a pair of different signal levels each occurring for a substantially equal predefined length of time;
means for defining a series of intervals of time with each interval having a duration substantially equal to the predefined length of time;
means for storing an indicium of the level of the received signal at each defined interval of time;
means responsive to the signal from said transceiver for reading stored indicia from said means for storing, and transmitting a data signal having a level which depends on said stored indicia; and
said transceiver comprises:
means for receiving the data signal from said transponder;
means for decoding the data signal to recover data characters represented by pairs of signal levels;
means for interfacing said transceiver to an external data processing device; and
means for transmitting a signal to said transponder.

15. The system as recited in claim 14 wherein said means for decoding the data signal in said transceiver comprises:
means for measuring the time interval between transitions in the level of the data signal; and means for comparing two consecutive time intervals to recover the data characters represented by the signal levels stored in the transponder.

16. The system as recited in claim 14 wherein said transponder further includes means for detecting operation instructions carried by the signal from said transceiver.

17. The system as recited in claim 16 wherein said transponder further includes means for detecting the strength of the received signal from the transceiver, and said means for detecting operation instructions being responsive to an indication from the signal strength detecting means that the strength of the received signal is above a predetermined magnitude that is greater than a minimum magnitude required for operation of said means for receiving to detect the signal from a transceiver.

* * * * *

UNITED STATES PATENT AND TRADEMARK OFFICE
CERTIFICATE OF CORRECTION

PATENT NO. : 5,144,314

DATED : September 1, 1992

INVENTOR(S) : Eric Malmberg et al.

It is certified that error appears in the above-identified patent and that said Letters Patent is hereby corrected as shown below:

In Column 23, at Line 14, "he" should be --the--.

In Column 23, at Line 66, delete "a memory for storing the recovere".

Signed and Sealed this

Twenty-eighth Day of September, 1993

Attest:

BRUCE LEHMAN

*Attesting Officer*     *Commissioner of Patents and Trademarks*